(12) United States Patent
Chan

(10) Patent No.: US 7,840,234 B2
(45) Date of Patent: Nov. 23, 2010

(54) METHOD AND MOBILE COMMUNICATION DEVICE CAPABLE OF RESUMING OPERATING FUNCTION OF TEMPORARILY DISABLED SIM CARD

(75) Inventor: Feng-Mao Chan, Huwei Township, Yunlin County (TW)

(73) Assignee: BenQ Corporation, Taipei (TW)

( * ) Notice: Subject to any disclaimer, the term of this patent is extended or adjusted under 35 U.S.C. 154(b) by 1552 days.

(21) Appl. No.: 11/136,397

(22) Filed: May 25, 2005

(65) Prior Publication Data

US 2005/0266886 A1  Dec. 1, 2005

(30) Foreign Application Priority Data

Jun. 1, 2004  (TW) .............................. 93115713 A

(51) Int. Cl.
H04M 1/00 (2006.01)
(52) U.S. Cl. .................... 455/558; 455/550.1; 455/410; 455/411; 455/418; 455/425; 379/211.05; 379/357.01; 379/433.09
(58) Field of Classification Search ......... 455/410–411, 455/418, 425, 550.1, 551, 558; 379/211.05, 379/357.01, 357.02, 433.09
See application file for complete search history.

(56) References Cited

U.S. PATENT DOCUMENTS 5,907,804 A * 5/1999 Schroderus et al. ......... 455/411
6,141,563 A * 10/2000 Miller et al. ................. 455/558
6,836,654 B2 * 12/2004 Decotignie .................. 455/410
6,850,777 B1 * 2/2005 Estes et al. .................... 455/558
7,450,929 B2 * 11/2008 Washio et al. ................ 455/410
7,496,382 B2 * 2/2009 Oomoto et al. .............. 455/560
2003/0135748 A1 * 7/2003 Yamada et al. .............. 713/193
2004/0248550 A1 * 12/2004 Hausner et al. .............. 455/410
2007/0197201 A1 * 8/2007 Washio et al. ................ 455/418
2008/0300020 A1 * 12/2008 Nishizawa et al. .......... 455/558
2009/0029736 A1 * 1/2009 Kim et al. .................... 455/558

* cited by examiner

Primary Examiner—Nick Corsaro
Assistant Examiner—Babar Sarwar

(57) ABSTRACT

A method and mobile communication device capable of resuming operating function of a temporarily disable SIM (subscriber identity module) card are provided. The SIM card is disposed in a mobile equipment (ME), in which a code verification state of the SIM card is recorded. When the code verification state is "verification required" state, the ME records an original personal identification number (PIN)/PIN unlock key (PIN/PUK) code corresponding to the SIM card. The method includes the steps of executing a SIM card start-up procedure; determining whether the code verification state of PIN/PUK code is the same with the state stored in the ME and whether a PIN/PUK code re-read from the SIM card is the same with the original one; and determining whether the international mobile subscriber identity (IMSI) value re-read from the SIM card is the same with original one: if so, resume and re-use the SIM card.

2 Claims, 4 Drawing Sheets

METHOD AND MOBILE COMMUNICATION DEVICE CAPABLE OF RESUMING OPERATING FUNCTION OF TEMPORARILY DISABLED SIM CARD

This application claims the benefit of Taiwan application Serial No. 93115713, filed Jun. 1, 2004, the subject matter of which is incorporated herein by reference.

BACKGROUND OF THE INVENTION

1. Field of the Invention

The invention relates in general to a method and mobile communication device capable of resuming operating function of a SIM card, and more particularly to a method and mobile communication device capable of resuming operating function of a temporarily disabled SIM card.

2. Description of the Related Art

An ordinary mobile phone is composed of a mobile equipment (ME) and a subscriber identity module (SIM) card. The SIM card is disposed in the mobile equipment. In a mobile phone communication system such as global system for mobile communication (GSM), the information of mobile phone number is stored in the SIM card issued to the user by a mobile phone service provider. When the SIM card is received at the slot of the mobile equipment which is power on, the mobile equipment would activate the SIM card for the mobile phone to obtain mobile network service.

When the mobile phone is power on and under normal operation, the SIM card might still be disabled due to factors such electrostatic interference, loose contact of the SIM card caused by loose fixing mechanism or other external factors. Meanwhile, the mobile equipment is incapable of operating the SIM card or reading the data stored in the SIM card by controlling the SIM card.

The SIM card may only be disabled for a short time, the mobile phone has to be turned power off then power on in order to activate and resume the SIM card. However, to turn the mobile phone off and on again is a waste of time and causes inconvenience to the user.

SUMMARY OF THE INVENTION

The object of the invention is to provide a method and mobile communication device capable of resuming operating function of a temporarily disabled SIM card without turning on the mobile phone again when the SIM card is disabled.

According to the object of the invention, a method capable of resuming operating function of a temporarily disabled subscriber identity module (SIM) card is provided. The SIM card is disposed in a mobile equipment (ME) in which an original IMSI value and a code verification state of the SIM card are stored. The code verification state includes a "verification required" state and a "verification not required" state, wherein if the code verification state is at the "verification required" state, the mobile equipment further records an original personal identification number/PIN unlock key (PIN/PUK) corresponding to the SIM card. The method of the invention includes the following steps. Step (a): a start-up procedure of the SIM card is executed. Step (b): determine whether verification of PIN/PUK code is required of the SIM card disposed in the mobile equipment: if so, proceed to step (c), otherwise proceed to step (e). Step (c): if the code verification state is "verification required", proceed to step (d). Step (d): the SIM card disposed in the mobile equipment is used to read a PIN/PUK code, then the PIN/PUK code is compared with the original PIN/PUK code: if the two codes are identical, proceed to step (f). Step (e): if the code verification state is "verification not required", proceed to step (f). Step (f): an IMSI value of the SIM card disposed in the mobile equipment is read. Step (g): the IMSI value is compared with the original IMSI value: if the two values are identical, the next step is executed. Step (h): the SIM card is resumed and re-used.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1 and FIGS. 2A~2C are method flowcharts of resuming operating function of a temporarily disabled subscriber identity module (SIM) card according to a preferred embodiment of the invention, wherein FIG. 1 illustrates the steps performed by a mobile equipment (ME) under normal operating state, while FIGS. 2A~2C are steps performed after the SIM card is temporarily disabled.

DETAILED DESCRIPTION OF THE INVENTION

Figure 1:
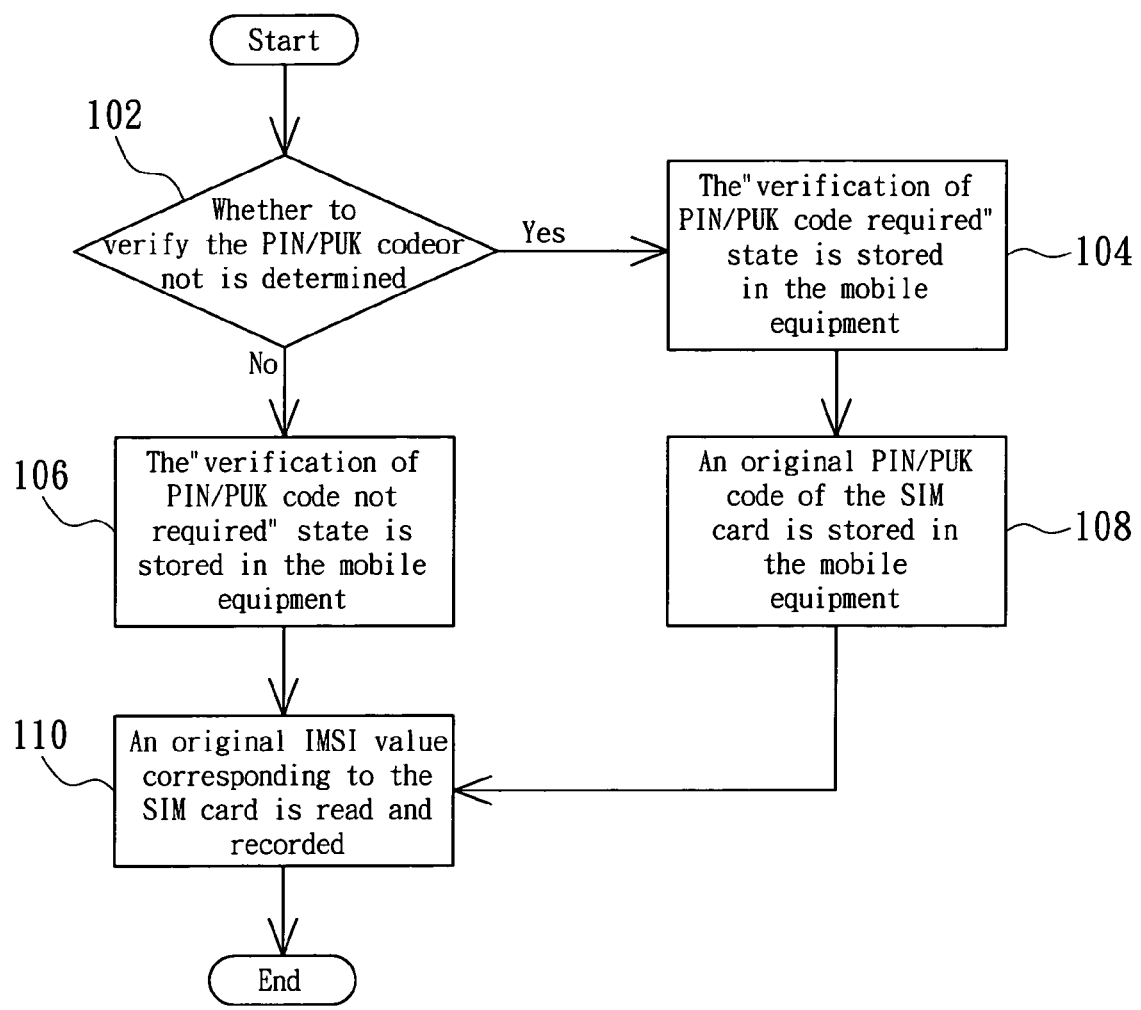
Figure 2A:
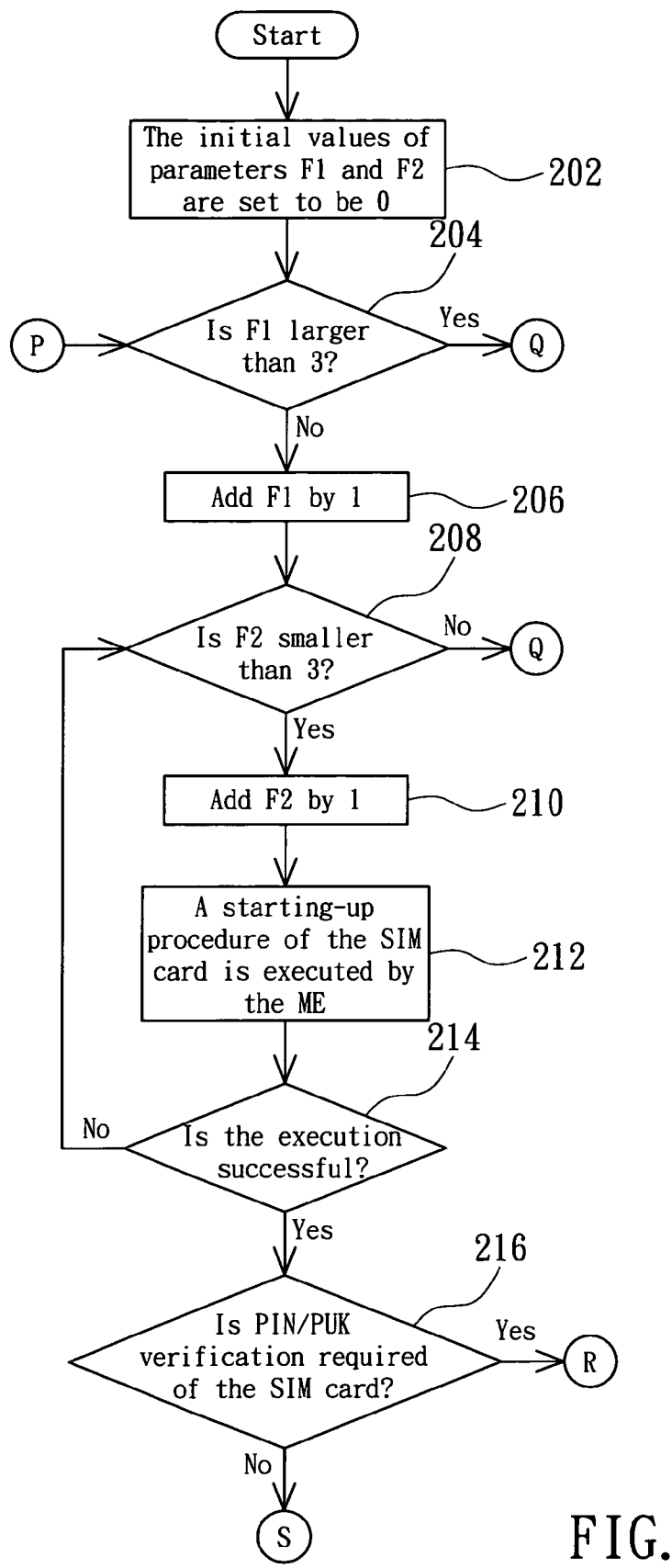
Figure 2B:
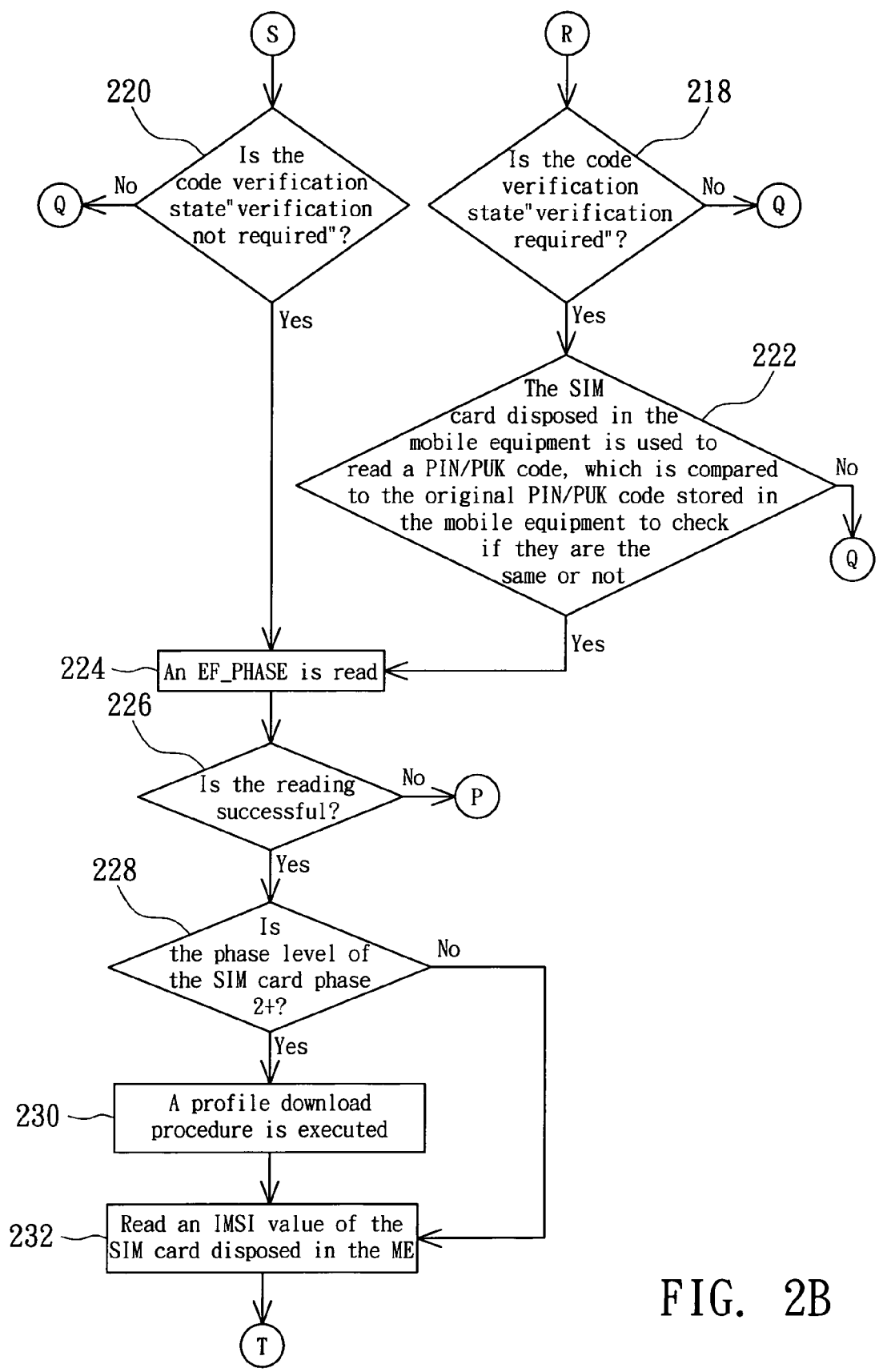
Figure 2C:
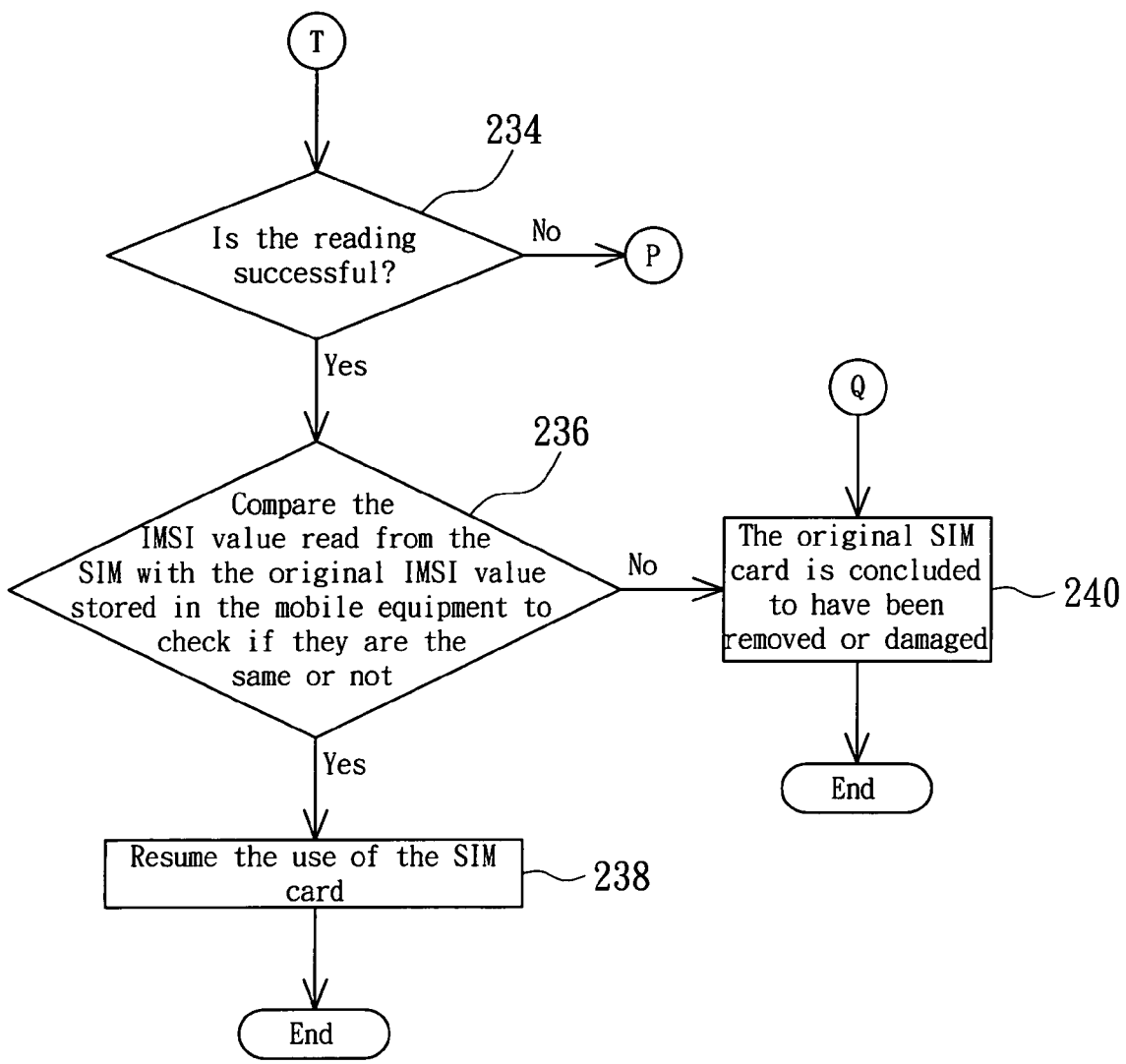

Referring to FIG. 1 and FIGS. 2A~2C, method flowcharts of resuming operating function of temporarily disabled subscriber identity module (SIM) card according to a preferred embodiment of the invention are shown. The method capable of resuming operating function of a temporarily disabled SIM card is applicable to a mobile communication device, comprising a mobile equipment and a SIM card disposed thereon. FIG. 1 illustrates the steps performed by the mobile equipment (ME) under normal operating state, while FIGS. 2A~2C are steps performed when the SIM card is temporarily disabled.

Referring to FIG. 1, when the mobile phone is booted and is under normal operation, the following steps are performed by the mobile equipment, and preferably, at the same time with the execution of a booting procedure. Firstly, in step 102: the mobile equipment determines whether to verify a PIN/PUK code: if so, proceed to step 104, otherwise proceed to step 106, wherein the PIN code is used to verify user's identification. After the mobile communication device is booted, the user, first of all, must input a personal identification number (PIN) code for a communication to be assumed. The setting of the PIN code protects the mobile communication device from being used by an unauthorized user. After three consecutive inputs of incorrect PIN code, the SIM card would be locked automatically. The user has to contact the telecommunication service provider for the SIM card to be unlocked by inputting a PIN unlock key (PUK) code.

In step 104: the "verification of PIN/PUK code required" state of the SIM card is stored in the mobile equipment. That is to say, the mobile equipment has the record of a code verification state, which currently is "verification required". After that, proceed to step 108: the current PIN/PUK code of the SIM card is regarded as an original PIN/PUK code and is stored in the mobile equipment. The original PIN/PUK code is the correct PIN code to be inputted by the user when the mobile communication device is power on. However, if the user changes the PIN code of the SIM card when the mobile communication device is power on, the PIN code is re-set and stored in the mobile equipment.

In step 106: the "verification of PIN/PUK code not required" state of the SIM card is stored in the mobile equipment. That is to say, the mobile equipment has the record of a code verification state, which currently is "verification not required". Following step 106 and 108, step 110 is performed: the mobile equipment reads the original international mobile subscriber identity (IMSI) elementary file EF_IMSI to obtain an IMSI value of the SIM card. The current IMSI value of the SIM card is regarded as an original IMSI value and stored in the mobile equipment. The IMSI value has the records of mobile country code (MCC), mobile network code (MNC) and other network related information.

Refer to FIGS. 2A~2C. When the SIM card is detected by the mobile equipment to be disabled due to electrostatic interference, loose contact or other external factors, the mobile equipment would perform the following steps to resume operating function of the SIM card. Firstly, perform step 202: the initial values of a first repeat count parameter F1 and a second repeat count parameter F2 are set to be 0. Next, proceed to step 204: determine whether the value of the first repeat count F1 is larger than 3: if so, proceed to step 240 and determine that the original SIM card has been removed or replaced with another SIM card, or the SIM card is damaged and can not be used; otherwise proceed to step 206.

In step 206: the value of the first repeat count parameter F1 is added by 1. Then, proceed to step 208: determine whether the value of the second repeat count parameter F2 is smaller than 3: if so, proceed to step 210; otherwise proceed to step 240 and determine that the SIM card has been removed or damaged. To compare the value of the first and the second repeat count parameters F1 and F2 with 3 is only an exemplification of the present embodiment. However, the first and the second repeat count parameters F1 and F2 can also be compared with other predetermined values to decide a maximum number of repeats in performing step 212.

After that, proceed to step 210, the value of the second repeat count parameter F2 is added by 1. Next, proceed to step 212: a SIM card start-up procedure such as an answer to reset (ATR) procedure is executed by the mobile equipment. In the ATR procedure, the operation requirement parameter of the SIM card is transmitted to the mobile equipment when the SIM card is booted. If necessary, the mobile equipment would execute a protocol and parameter select (PPS) procedure to answer the ATR procedure of the SIM card. The mobile equipment uses the PPS procedure to answer the SIM card whether these operation requirement parameter are accepted by the mobile equipment.

After that, proceed to step 214: determine whether the execution of step 212 is successful: if so, proceed to step 216, otherwise return to step 208. In step 216, the mobile equipment determines whether to verify the PIN/PUK code of the SIM card disposed in the mobile equipment: if so, proceed to step 218, otherwise proceed to step 220. In step 218, the mobile equipment determines whether the SIM card stored in the mobile equipment is at "verification of PIN/PUK code required" state: if so, proceed to step 222; otherwise proceed to step 240. That is to say, proceed to step 222 if the code verification state is "verification required". In step 222, the SIM card disposed in the mobile equipment is used to read a PIN/PUK code, which is compared with the original PIN/PUK code stored in the mobile equipment: if the two codes are identical, proceed to step 224, otherwise proceed to step 240.

In step 220, the mobile equipment determines whether the SIM card stored in the mobile equipment is at "verification of PIN/PUK code not required" state: if so, proceed to step 224, otherwise proceed to step 240. That is, proceed to step 224 if the code verification state is "verification not required". In step 218 to step 222, the mobile equipment, first of all, determines whether the state of SIM card stored in the mobile equipment is the same with the state before the SIM card is disabled, and determines whether the PIN/PUK code still remains the same afterwards. As long as one of the two states of the SIM card is determined to be different from the sate stored in the mobile equipment, the SIM card is determined to have been removed or damaged.

Proceed to step 224: a phase elementary file EF_PHASE of the SIM card is read, wherein the phase level of the SIM card is stored in the phase elementary file EF_PHASE. Normally, the SIM card has a phase level such as phase 1, phase2 or phase2+ for instance. The phase 1, phase2 and phase2+ SIM cards are respectively applicable to GSM Phase I, Phase II and Phase II+ standards. In terms of the mobile equipment, the GSM Phase I and Phase II SIM cards are passive, while the GSM Phase II+ SIM card is a pro-active SIM card, which can actively execute its own application programs and instruct the mobile equipment to execute relevant actions.

Next, proceed to step 226: determine whether the reading of the phase elementary file EF_PHASE is successful: if so, proceed to step 228, otherwise return to step 204. In step 228, determine whether the phase level of the SIM card is phase2+: if so, proceed to step 230, otherwise proceed to step 232. In step 230, the mobile equipment executes a profile download procedure then proceeds to step 232 after the execution of the profile download procedure is completed. Only after the profile download procedure has been executed by the mobile equipment, can the Phase II+ SIM card determine whether the mobile equipment is capable of executing the application program of the SIM card and other related actions.

Following that, in step 232: re-read the IMSI elementary file EF_IMSI of the SIM card so as to read an IMSI value of the SIM card disposed in the mobile equipment. Then, proceed to step 234: determine whether the reading is successful: if so, proceed to step 236, otherwise return to step 204. In step 236, compare the IMSI value read from the SIM with the original IMSI value stored in the mobile equipment: if the two values are identical, proceed to step 238 where the use of the SIM card is\resumed, otherwise proceed to step 240 where the original SIM card is determined to have been removed, changed to another SIM card, or damaged and can not be used. Step 224 to step 230 can also be performed in the wake of steps 232 to 236.

The method and mobile communication device capable of resuming operating function of a temporarily disabled SIM card disclosed in above embodiment fulfils the inadequacies of the mobile equipment such as a weak protection of electrostatic interference or a loose fixing structure of the SIM card. When the SIM card is electrically disconnected with the mobile equipment and becomes disabled, the invention is capable of electrically connecting the mobile equipment with the SIM card and resuming the operating function of the SIM card. Besides, the invention can promptly resume the operating function of the SIM card resuming without interfering with the user's normal operation of the mobile communication device. That the user is capable of resuming the operating function of the SIM card without turning on the mobile communication device again really provides great convenience to the user.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for checking a temporarily disabled subscriber identity module (SIM) card disposed in mobile equipment (ME), comprising: (a) storing a code verification state of the SIM card in the ME, the code verification state being selectively a "verification of PIN/PUK code required" state or a "verification of PIN/PUK code not required" state; (b) executing a SIM card start-up procedure when the SIM card is temporarily disabled; and (c) determining whether verification of PIN/PUK code is required for the ME, evaluating the stored code verification state, determining whether verification is required, determining the SIM card has been removed or damaged, when verification of PIN/PUK code is not required and the stored code verification state is "verification of PIN/PUK code required" or when verification of PIN/PUK code is required and the stored code verification state is "verification of PIN/PUK code not required."

2. The method according to claim 1, wherein an original IMSI value is stored in the ME, and the method further comprises:
   (b1) determining whether verification of PIN/PUK code is required for the ME, wherein when verification of PIN/PUK code is not required and the stored code verification state is "verification of PIN/PUK code not required" or when verification of PIN/PUK code is required and the stored code verification state is "verification of PIN/PUK code required", the process proceeds to step (b2); and
   (b2) determining whether an IMSI value of the SIM card is not identical to the original IMSI value, wherein when the IMSI value of the SIM card is not identical to the original IMSI value, the SIM card is determined to have been removed or damaged.

* * * * *